United States Patent
Plourde et al.

[19]

[11] Patent Number: 6,139,307
[45] Date of Patent: Oct. 31, 2000

[54] ASSEMBLY FOR MOLDING OPTICAL DATA STORAGE DISKS FORMATTED ON BOTH SIDES

[75] Inventors: Douglas R. Plourde, Somerset, Wis.; Dean E. Sitz, Wahpeton, N. Dak.; Val M. Schmitz, Oakdale, Minn.

[73] Assignee: Imation Corp., Oakdale, Minn.

[21] Appl. No.: 09/121,366

[22] Filed: Jul. 23, 1998

[51] Int. Cl.[7] .......................... B29D 17/00; B29C 45/00; B29C 47/00
[52] U.S. Cl. ........................ 425/192 R; 264/106
[58] Field of Search ................ 425/810, 192 R; 264/328.12, 106

[56] References Cited

U.S. PATENT DOCUMENTS

| | | |
|---|---|---|
| 4,185,955 | 1/1980 | Holmes et al. . |
| 4,391,579 | 7/1983 | Morrison ................................ 425/548 |
| 4,681,527 | 7/1987 | Amory et al. . |
| 4,707,321 | 11/1987 | Segawa et al. ......................... 264/294 |
| 4,789,320 | 12/1988 | Sasamura et al. ..................... 425/190 |
| 5,018,962 | 5/1991 | Kitamura et al. ...................... 425/556 |
| 5,202,880 | 4/1993 | Lee et al. .............................. 369/275.4 |
| 5,460,763 | 10/1995 | Asai ....................................... 264/107 |
| 5,470,627 | 11/1995 | Lee et al. ................................ 428/64.4 |
| 5,476,700 | 12/1995 | Asai et al. .............................. 428/66.6 |
| 5,607,705 | 3/1997 | Asai . |
| 5,780,068 | 7/1998 | Shinohara ............................... 425/168 |
| 5,804,229 | 9/1998 | Asai ........................................ 425/556 |
| 5,827,593 | 10/1998 | Maruyama et al. ................... 428/64.1 |
| 5,893,998 | 4/1999 | Kelley et al. ........................... 249/111 |

FOREIGN PATENT DOCUMENTS

| | | |
|---|---|---|
| 0018210 | 10/1980 | European Pat. Off. . |
| 0 566 032 A2 | 10/1993 | European Pat. Off. . |
| 9-048045 | 2/1997 | Japan . |

*Primary Examiner*—Harold Pyon
*Assistant Examiner*—Emmanuel S. Luk
*Attorney, Agent, or Firm*—Eric D. Levinson

[57] ABSTRACT

A mold assembly for forming a replica disk in a disk molding process. The replica disk includes a formatted surface on both sides. The mold assembly includes a disk substrate cavity defined by a first block having a first major surface, a second block having a second major surface, and an outside edge. The first stamper has an outside edge. The first outer holder includes a first holder edge, the first holder edge extends over the outside edge of the first stamper, coupling the first stamper to the first major surface. A second stamper having an outside edge is coupled to the second major surface. A channel is provided in fluid communication with the disk substrate cavity for allowing disk molding material to enter the disk substrate cavity. Further, a stripper mechanism may be located at the outside edge, wherein the stripper mechanism is moveable relative to the first block and the second block.

15 Claims, 6 Drawing Sheets

ASSEMBLY FOR MOLDING OPTICAL DATA STORAGE DISKS FORMATTED ON BOTH SIDES

TECHNICAL FIELD

The present invention relates generally to the field of manufacture of data storage disks, and in particular, to a method and assembly for molding optical data storage disks formatted on both sides, wherein the disks are capable of containing a high density of information.

BACKGROUND OF THE INVENTION

Data storage disks are produced using a disk replication process. A master disk is made having a desired surface relief pattern formed therein. The surface relief pattern is typically created using an exposure step (e.g., by laser recording) and a subsequent development step. The master is used to make a stamper, which in turn is used to stamp out replicas in the form of replica disk substrates as part of a disk molding process. As such, the surface relief pattern, information and precision of a single master car be transferred into many inexpensive replica disk substrates.

Conventional mold assemblies typically include a fixed side and a moving side. The stamper may be typically attached to the moving side for replicating a desired surface relief pattern (i.e., lands, grooves and/or pits) into the replica disk substrate. A movable gate cut may be provided for cutting a central opening in the replica disk substrates. The stamper may be secured to the moving side using an inner holder, wherein the inner holder fits over the stamper. Several more tooling parts may be located at the enter of the mold assembly.

During the disk molding process, a resin, typically optical grade polycarbonate, is forced in through a sprue channel into a substrate cavity within the mold assembly to form the replica disk substrate. The surface relief pattern or formatted surface is replicated in the replica disk substrate by the stamper as the cavity is filled. After filling, the gate cut is brought forward to cut a center hole in the replica disk substrate. After the replica disk has sufficiently cooled, the mold assembly is opened and the gate cut and a product eject may be brought forward for ejecting the formatted replica disk substrate off of the stamper. The inner holder may be removable to allow changeout of the stamper.

While the resin is forced into the substrate cavity of the mold assembly by the molding press. Injection pressure overcomes clamp force causing mold to open a small amount (commonly termed "mold blow"), pressure is then increased to the mold assembly to clamp the mold shut, forcing the resin into the microscopic surface relief pattern of the stamper (which contains the reverse image of the desired replica disk surface relief pattern). Thus, the above process is commonly termed "injection compression" or "micro-coining".

The resin is required to be highly viscous so that it may flow into the microscopic detail of the stamper surface relief pattern. The molding process requires the mold assembly to have the capability to "breath" or to open a small amount after injection of the resin into the disk substrate cavity. As the mold assembly "breathes", small openings may be created around the perimeter of the mold assembly, allowing for resin to enter into the openings, causing what is known as mold "flash". Due to the viscous nature of the resin, even very small openings may allow the resin to flash.

Mold flash may cause several problems. Such problems include out of specification parts or contamination from debris generated from the flash area during use of the disk. FIG. 1 is a partial cross-sectional view illustrating a prior art mold. As shown, some optical media molds employ a telescoping shutoff to compensate for mold blow. With a telescoping shutoff, one side of the mold enters into the cavity of the other, where the contacting surfaces or running surfaces are at a very slight angle (indicated at A and B). The telescoping shutoff allows the mold assembly to open a small amount, allowing minimal flash but does require the mold halves to be perfectly aligned to one another.

For single layer optical disk media formatted on one side, mold assemblies have been designed to limit flash such that it occurs only on the non-functional areas of the disk. By limiting the flash to the non-functional areas of the disk, interference problems caused by the flash may be reduced.

As optical disk technology has evolved, optical disks have increased in storage capacity. Higher density disks have resulted in the storage of a greater amount of information (areal density) within the same size of disk surface area. Higher density optical disk formats are required to be manufactured having smaller track pitches. For increased storage capacity, these disks may include formatted surfaces on both sides (i.e., typically termed double-sided disks). Double-sided disks are made by placing two single-sided disks (i.e., two single layer disks formatted on one side) back-to-back. These higher areal density disks have stricter requirements and tighter design criteria, requiring more complex molding processes. As data storage capacity increases, often problems which may result from flash or other mold blow problems are magnified.

For disk formats utilized in flying head applications, as disk capacity increases the design tolerances for the desired surface relief pattern become more critical. The flying heads may be required to pass closer to the disk substrate, requiring tighter disk specifications, including a reduction or elimination of disk surface geometry imperfections, such as mold flash protrusions.

SUMMARY OF THE INVENTION

The present invention provides a mold assembly for forming a optical data storage disk in a disk molding process. The optical data storage disk has a formatted surface on two sides. The mold assembly includes a disk substrate cavity defined by a first block having a first major surface, a second block having a second major surface, and an outside edge. A first stamper is provided including an outside edge. A first holder including a first holder edge is provided, wherein the first holder edge extends over the outside edge of the first stamper, coupling the first stamper to the first major surface. A second stamper having outside edges coupled to the second major surface. A channel is provided in fluid communication with the disk substrate cavity for allowing disk molding material to enter the disk substrate cavity.

A stripper mechanism may be located at the outside edge, wherein the stripper mechanism is moveable relative to the first block and the second block. Further, means may be provided for moving the stripper mechanism relative to the first block. The means for moving the stripper mechanism relative to the first block may move the stripper mechanism in a direction generally perpendicular to the first major surface.

A second outer holder may be provided which includes a second outer holder edge, the second outer holder edge extends over the outside edge of the second stamper for coupling the second stamper to the second major surface. In one aspect, the first block is moveable relative to the second block.

In a second embodiment, the present invention provides a mold assembly for forming a optical data storage disk in a disk molding process. The optical data storage disk includes a formatted surface on both sides. The mold assembly is moveable between a mold open position and a mold closed position. The mold assembly includes a first mirror block having a first major surface. A second mirror block is provided having a second major surface, wherein when the mold assembly is in the mold closed position the first major surface and the second major surface define a disk substrate cavity, the disk substrate cavity having an outside edge. A channel is in fluid communication with the disk substrate cavity for allowing disk molding material to enter into the disk substrate cavity to form the optical data storage disk. A first stamper is located on one side of the disk substrate cavity for forming a formatted pattern in the optical data storage disk. Means are located at the outside edge for removably coupling the first stamper to the first major surface. A second stamper is located on one side of the disk substrate cavity opposite the first stamper, for forming a formatted pattern in the optical data storage disk. Means are located at the outside edge for removably coupling the second stamper to the second major surface.

A stripper mechanism may be located at the outside edge, wherein the stripper mechanism is moveable relative to the first mirror block and the second mirror block. In one aspect, the stripper mechanism is moveable in a direction generally perpendicular to the first major surface and the second major surface.

The means for removably coupling the first stamper to the first major surface may include a first outer holder. The first outer holder may include a first holder edge that extends over an outside edge of the first stamper for coupling the first stamper to the first major surface. A stripper mechanism may be located at the outside edge, wherein the stripper mechanism is moveable relative to the first mirror block and the second mirror block. In one aspect, the outer holder is located between the stripper mechanism and the first mirror block.

The stripper mechanism may include a stripper mechanism first running surface, and the first outer holder may include a first outer holder running surface, wherein the stripper mechanism first running surface and the first outer holder running surface are operably arranged such that the stripper mechanism first running surface continuously contacts the first outer holder running surface when the mold assembly is in a closed position and when disk molding material is injected into the disk substrate cavity. The stripper mechanism may include a stripper mechanism second running surface and the means for removably coupling the second stamper to the second major surface may include coupling means running surface, wherein the stripper mechanism second running surface and the coupling means running surface are operably arranged such that the stripper mechanism second running surface continuously contacts the coupling means running surface when the mold assembly is in a closed position and disk material is injected into the disk substrate cavity. Further, means may be coupled to the stripper mechanism for moving the stripper mechanism relative to the means for removably coupling the first stamper to the first major surface.

In another aspect, when mold material is injected into the disk substrate cavity an outward force is applied to the mold assembly, and wherein the assembly further comprises means for applying a force to the stripper mechanism in a direction opposite the outward force.

In a third embodiment, the present invention provides a mold assembly for forming a optical data storage disk in a disk molding process. The optical data storage disk includes a formatted surface on both sides. The mold assembly is moveable between a mold open position and a mold closed position. The mold assembly includes a first mirror block having a first major surface. A second mirror block is provided having a second major surface. When the mold assembly is in the mold closed position, the first major surface and the second major surface define a disk substrate cavity having an outside edge. A channel is provided in fluid communication with the disk substrate cavity for allowing the disk molding material to enter the disk substrate cavity to form the optical data storage disk. A first stamper is located on one side of the disk substrate cavity for forming a formatted pattern into the optical data storage disk. A first outer holder having an edge extending over an outer edge of the first stamper is provided, coupling the first stamper to the first major surface. A second stamper is located on a side of the disk substrate cavity opposite the first stamper, for forming a formatted pattern into the optical data storage disk. A second outer holder is provided having an edge extending over an edge of the second stamper, coupling the second stamper to the second major surface. A stripper mechanism is located at an outside edge, wherein the stripper mechanism is moveable relative to the first mirror block and the second mirror block.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION

Figure 1:
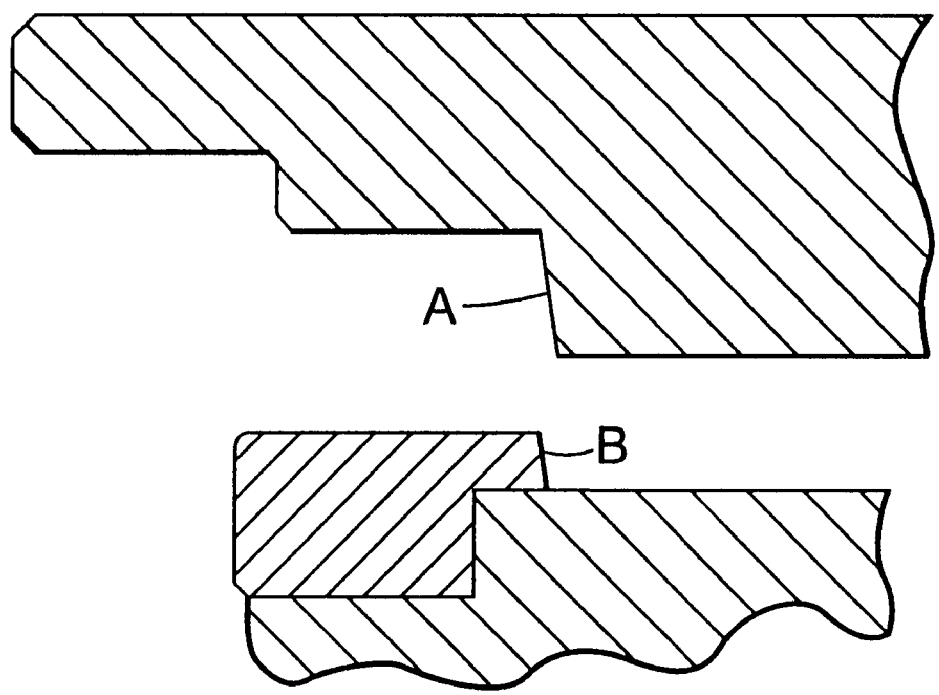
FIG. 1 is a partial cross-sectional view of a prior art mold assembly having a telescoping shutoff.
Figure 2:
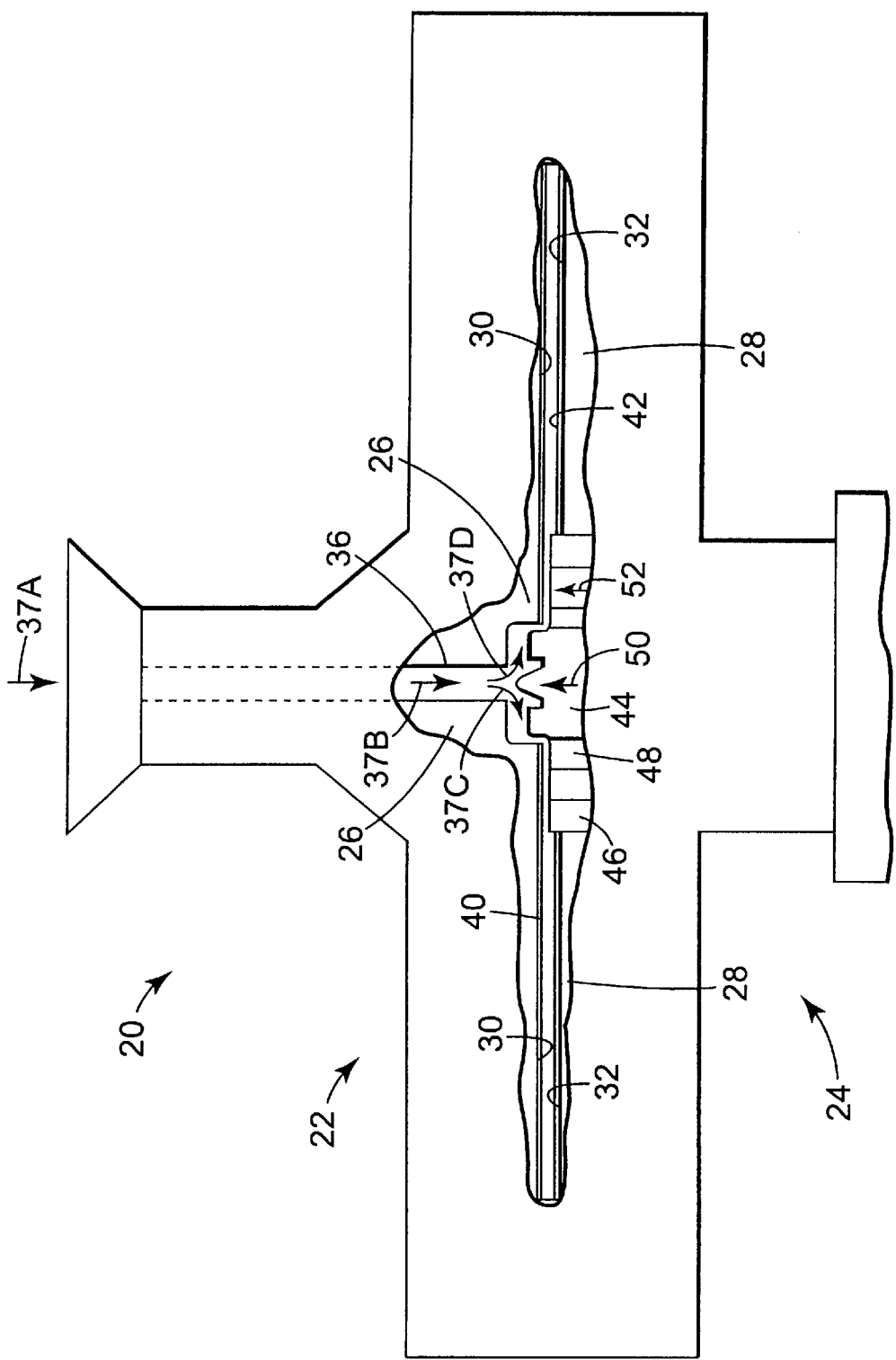
FIG. 2 illustrates one exemplary embodiment of a mold assembly in accordance with the present invention.

In FIG. 2, one exemplary embodiment in a mold assembly in accordance with the present invention is generally shown at 20. Mold assembly 20 is used for forming optical data storage disks (i.e., replica disks) in a disk molding process. Further, the mold assembly 20 is capable of forming replica disk having a formatted surface on both sides. The unique mold assembly 20 is capable of forming replica disks capable of storing a high density of information, while reducing or eliminating problems associated with conventional mold assemblies, such as flash due to mold blow. As such, mold assembly 20 in accordance with the present invention may be used for forming replica disks having disk formats utilized in flying head applications, where the flying heads are required to pass close to the disk substrate.

Mold assembly 20 includes a fixed side 22 and a moving side 24. During operation of the mold assembly 20, moving side 24 moves relative to fixed side 22 as the mold assembly 20 is moved between a mold open and a mold closed position. In particular, mold assembly 20 includes a first mirror block 26 and an opposing, second mirror block 28. In the exemplary embodiment shown, first mirror block 26 is located on fixed side 22, and second mirror block 28 is located on moving side 24. First mirror block 26 includes a first major surface 30 and second mirror block 28 includes a second major surface 32. When the mold assembly 20 is in the mold closed position, the first major surface 30 and the second major surface 32 are spaced apart to define a disk substrate cavity 34, wherein the disk substrate cavity is approximately the size of a replica disk. A sprue channel 36 extends longitudinally into the mold assembly 22, in fluid communication with disk substrate cavity 34. As such, disk substrate molding material (e.g., a polycarbonate resin) may be injected under pressure through sprue channel 36 and into disk substrate cavity 34, indicated by arrows 37A, 37B, 37C and 37D.

The unique disk mold assembly 20 in accordance with the present invention provides for molding of a dual-sided data storage disk (i.e., a disk formatted on both sides), having reduced or eliminated mold flash. In particular, a first stamper 40 is positioned on first major surface 30, and a second stamper 42 is positioned on second major surface 32. First stamper 40 and second stamper 42 include a surface relief pattern (i.e., lands, grooves and/or pits) for replicating a desired surface relief pattern into a replica disk substrate formed in disk substrate cavity 34 by mold assembly 20.

Additional tooling parts may be located at the center region of mold assembly 20, such as gate cut 44 and inner holder 46, and product eject 48 shown. Gate cut 44 and product eject 48 are moveable relative first mirror block 26 and second mirror block 28. After filling the disk substrate cavity 34 with resin to form a replica disk, gate cut 44 may be brought forward, indicated by arrow 50, to cut a center hole in the replica disk substrate. After the replica disk has sufficiently cooled, the mold assembly 20 is opened and the gate cut 44 and product eject 48 may be brought forward, indicated by arrow 52, for ejecting the formatted replica disk substrate off of mold assembly 20, and in particular, second stamper 42.

Figure 3:
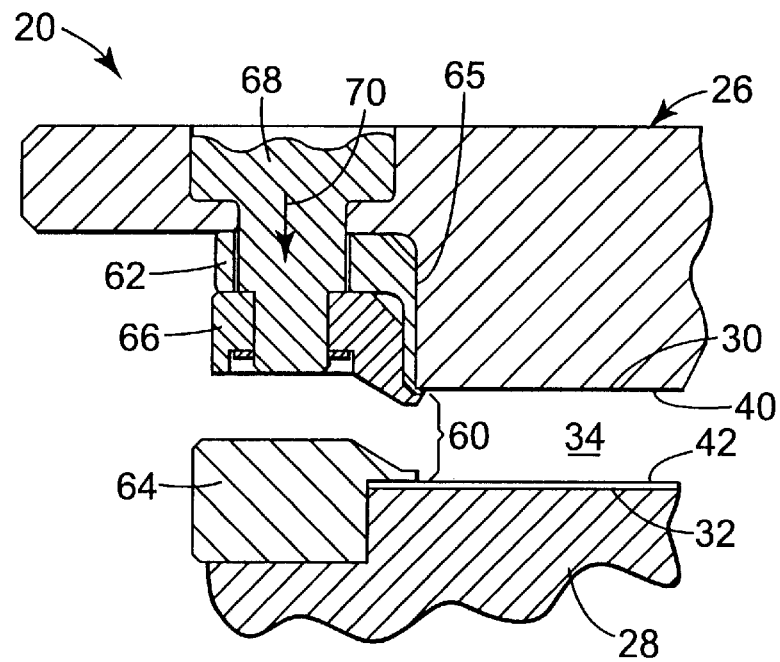
FIG. 3 is a partial cross-sectional view illustrating one exemplary embodiment of a mold assembly in accordance with the present invention in an open position.

In FIG. 3, an enlarged partial cross-sectional view illustrating an outside edge of mold assembly 20 is shown. Mold assembly 20 is shown in an open position. At outside edge 60, mold assembly 20 includes first outer holder 62, second outer holder 64, and stripper mechanism 66. First outer holder 62 is located about an outside edge 65 of first mirror block 26, and is positioned between stripper mechanism 66 and first mirror block 26. First outer holder 62 operates to fixedly (i.e., securely) retain first stamper 40 against first major surface 30 during the disk molding process. Similarly, second outer holder 64 is positioned about an outside edge of second mirror block 28. Second outer holder 64 operates to securely retain second stamper 42 against second major surface 32. Further, both first outer holder 62 and second outer holder 64 are removable, allowing removal and replacement of first stamper 40 or second stamper 42 for another stamper. In one embodiment shown, stripper mechanism 66 is ring shaped, and located immediately adjacent first outer holder 62, being positioned between first outer holder 62 and second outer holder 64.

Mold assembly 20 further includes a mechanism or means 68 which is mechanically coupled to stripper mechanism 66 for applying a force to stripper mechanism 66 in the disk molding process. Mechanism 68 (partially shown) can be a pneumatic actuator, a hydraulic actuator, spring mechanism, or other mechanism capable of providing or transmitting a force (indicated by force arrow 70) to stripper mechanism 66.

Figure 4:
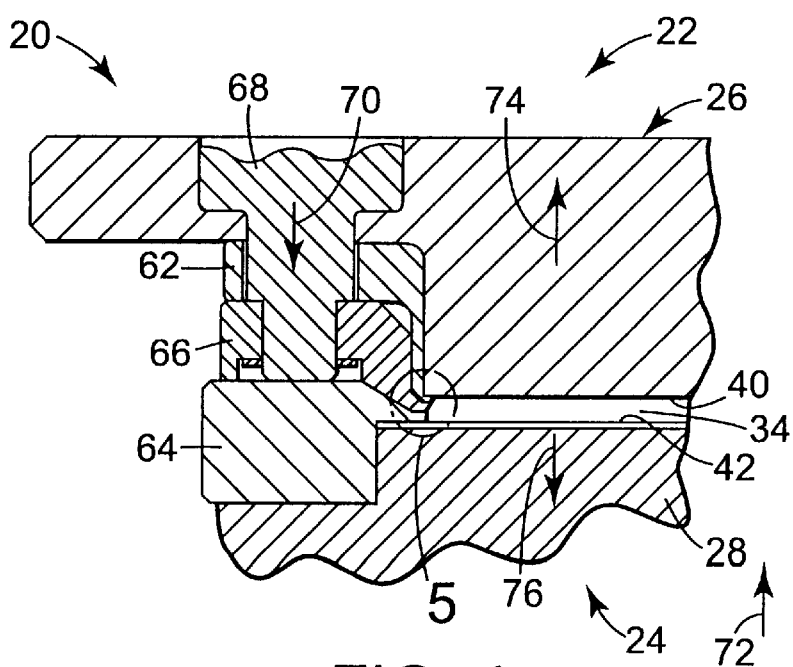
FIG. 4 is a partial cross-sectional view illustrating one exemplary embodiment of the mold assembly of FIG. 3 in a closed position.

In FIG. 4, a partial cross-sectional view illustrating mold assembly 20 in accordance with the present invention in a closed position is shown. Mold assembly 20 is in a position for molding replica disks, using an injection molding process. Disk substrate cavity 34 defines the shape of a replica disk formed by mold assembly 20. In particular, disk substrate cavity 34 is defined by first stamper 40 and second stamper 42. Disk substrate cavity 34 has an outside edge defined by first outer holder 62, second outer holder 64, and stripper mechanism 66. Mold assembly 20 is moved into a closed position by moving side 24 relative to fixed side 22 indicated by arrow 72. Mold press side 24 moves by force 72. When a desired disk substrate material is injected into disk substrate cavity 34, the disk substrate material is injected under pressure, this pressure overcomes molding press clamp pressure 72, resulting in outward pressure on mold assembly 20, indicated by arrows 74, 76. Force mechanism 68 applies a force (70) to stripper mechanism 66 resulting in stripper mechanism 66 maintaining continuously contacting second outer holder 64, while maintaining a contiguous outer edge 60 which does not permit openings for the formation of mold flash.

Figure 5:
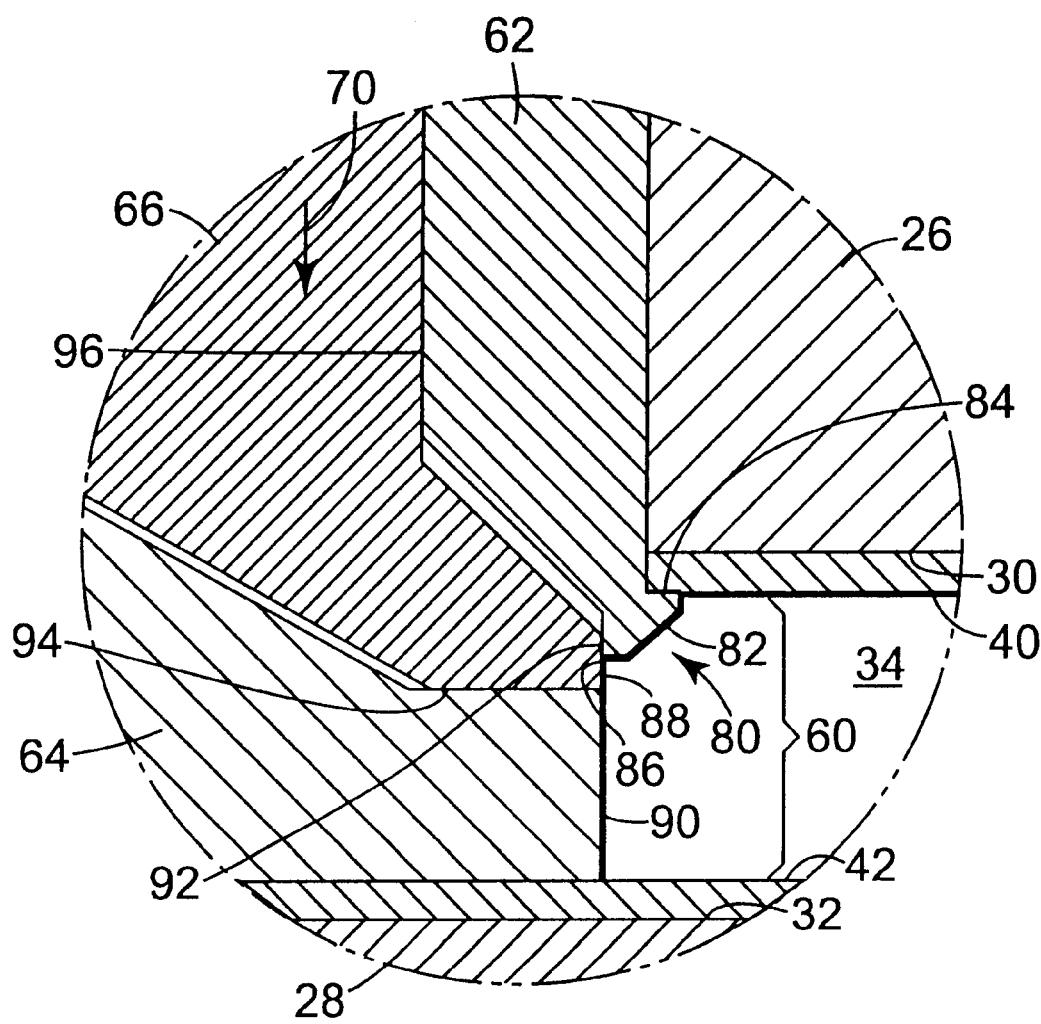
FIG. 5 is an enlarged partial cross-sectional view illustrating one exemplary embodiment of the circled region of FIG. 4.

In FIG. 5, an enlarged partial cross-sectional view is illustrated showing one exemplary embodiment of the region surrounding outside edge 60. First outer holder 62 includes an outwardly extending member, protrusion, or flange 80 which includes first major surface 82, first minor surface 84 and second minor surface 86. Relief surface 82 forms a portion of outside edge 60. The first outer holder 62 securely retains first stamper 40 against first mirror block of first major surface 30 at first minor surface 84. Outside edge 60 is further defined by a portion of stripper mechanism first surface 88 and second outer holder of first surface 90. A first running surface 92 exists between the first outer holder 62 and stripper mechanism 66. A second running surface 94 exists between stripper mechanism 66 and second outer holder 64. A third running surface 96 exists between stripper mechanism 66 and first outer holder 62. The term "running surface" as used herein is defined by two adjacent surfaces which continuously contact each other while being moveable relative to each other.

In particular, during the "mold blow" phase while the resin fills disk substrate cavity 34, the mold "breathes" at the aforementioned running surfaces such that the surfaces are moveable relative to each, but continue to contact each other and as a result do not allow mold flash to occur. Further, during the mold blow process, force mechanism 68 maintains continuous contact of stripper mechanism 66 against outer holder 64 at second running surface 94. The unique mold assembly 20 in accordance with the present invention may be used to mold replica disks having a small track pitch, having surface relief patterns suitable for flying head applications.

The interaction between first outer holder 62, second outer holder 64, and stripper mechanism 66 at outside edge 60 allow replica disks to be molded having formatted surfaces on each side, while reducing or entirely eliminating mold flash. The aforementioned running surfaces allow the mold assembly to "breathe" during the disk molding process, without creating undesirable openings which allow mold flash to occur.

Figure 6:
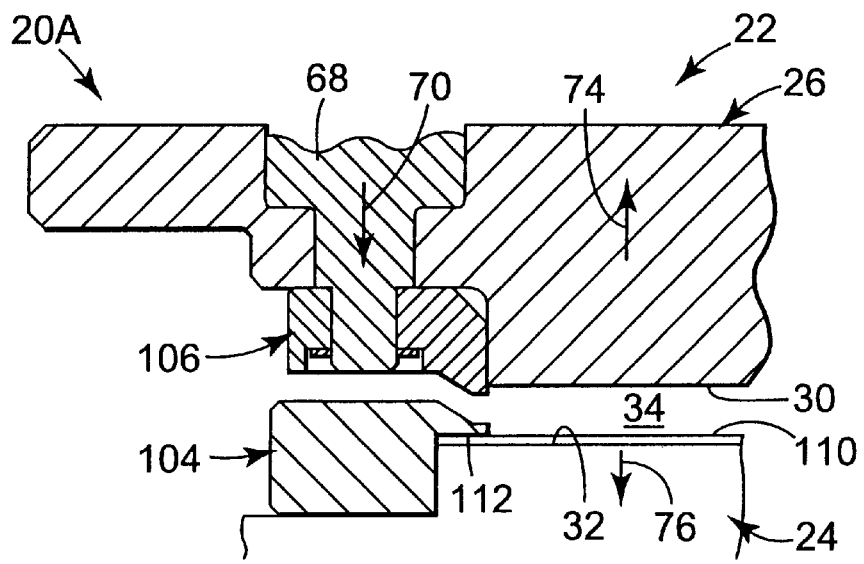
FIG. 6 is a partial cross-sectional view illustrating another exemplary embodiment of a mold assembly in accordance with the present invention in an open position.

In FIG. 6, an enlarged partial enlarged cross-sectional view illustrating an alternative embodiment of a disk molding assembly in accordance with the present invention is generally shown at 20A. The disk molding assembly 20A is shown in an open position. Mold assembly 20A is used for molding replica disks having a surface formatted on a single side. Further, mold assembly 20A provides for replica disks having reduced or eliminated mold flash.

Mold assembly 20A includes outer holder 104, stripper mechanism 106 and mechanism for applying force 68, which can be similar to second outer holder 64, stripper mechanism 66, and mechanism for applying force 68, respectively, as previously described herein. Disk substrate cavity 34 is defined by first major surface 30 and a stamper 110. Outer holder 104 includes an edge 112 which extends over stamper 110, securely retaining stamper against second major surface 32. Stripper mechanism 106 is preferably ring shaped, and positioned immediately adjacent first mirror block 26.

Figure 7:
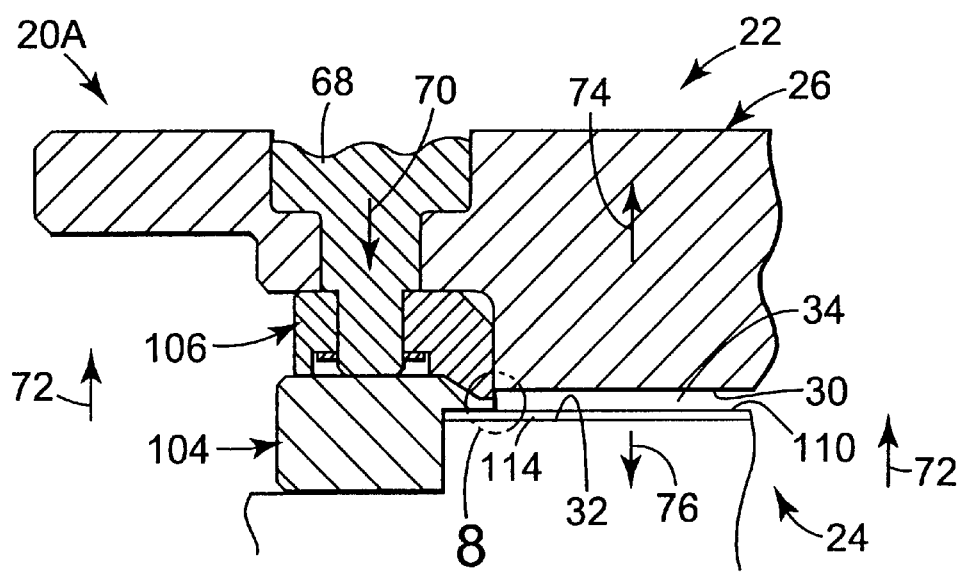
FIG. 7 is a partial cross-sectional view illustrating the mold assembly of FIG. 6 in a closed position.

In FIG. 7, an enlarged partial cross-sectional view illustrating mold assembly 20A in a closed position is shown. Moving side 24 is moved relative to fixed side 22 to move mold assembly 20A from the open position of FIG. 6 to the closed position of FIG. 7. In a closed position, force mechanism 68 is activated for maintaining stripper mechanism 106 against outer holder 104. In particular, force mechanism 68 allows continuous contact between the stripper mechanism 106 and outer holder 104 during the disk molding process. As the disk molding material is injected under the pressure into the disk substrate cavity 34 resulting in outward forces on mold assembly 20A (generally indicated by arrows 74, 76) which overcome mold press clamp force 72, force mechanism 68 provides a counter force (generally indicated by force arrow 70) to maintain a contiguous outside edge 114 about the disk substrate cavity 34.

Figure 8:
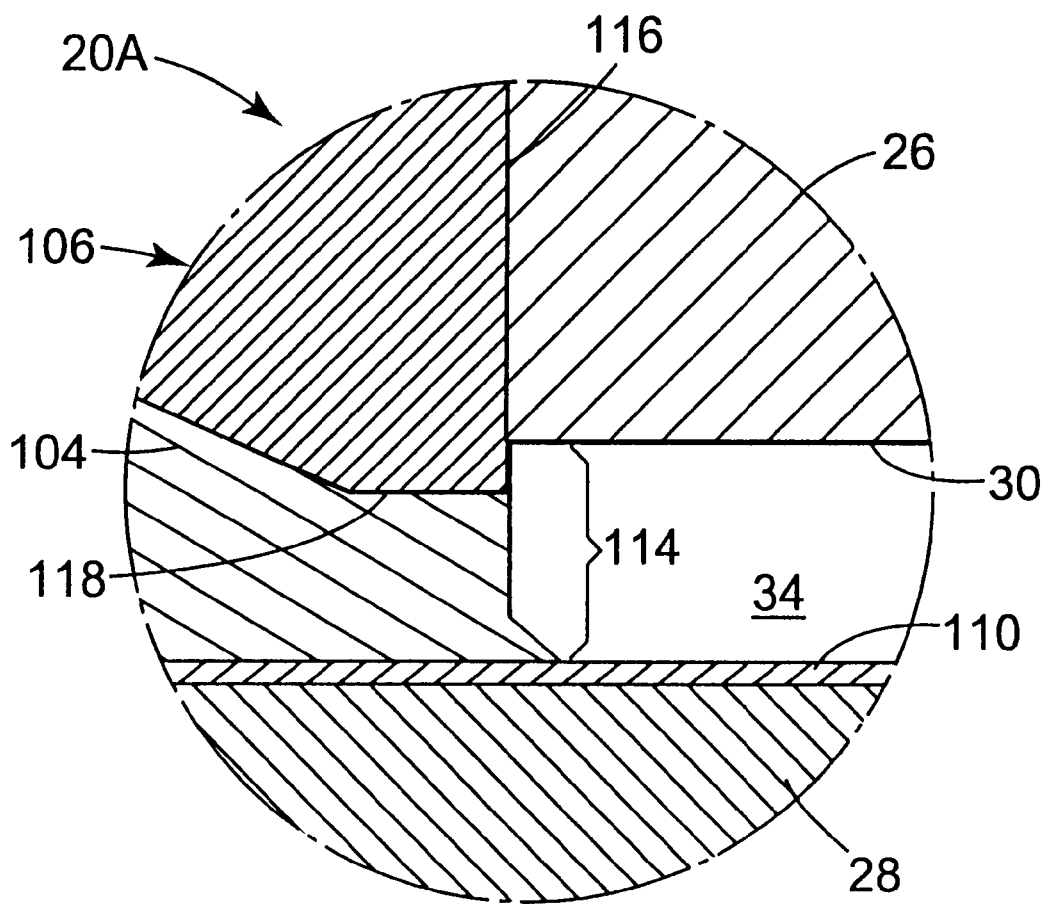
FIG. 8 is an enlarged partial cross-sectional view illustrating one exemplary embodiment of the circled region of FIG. 7.

In FIG. 8, an enlarged cross-sectional view illustrating the region surrounding outside edge 114 of FIG. 7 is shown. Mold assembly 20A includes first running surface 116 and second running surface 118. Stripper mechanism 106 is moveable relative to first mirror block 26 at first running surface 116. Stripper mechanism 106 maintains contact with outer holder 104 at second running surface 118. As such, as mold assembly 20A breathes during a disk molding process, first mirror block 26 moves relative to stripper mechanism 106 along first running surface 116, while force mechanism 68 continuously applies a force to stripper mechanism 106, resulting in continuous contact between stripper mechanism 106 and second running surface 118. This allows a contiguous outside edge 114 to be maintained during the disk molding process. The use of stripper mechanism 106 in combination with force mechanism 68 maintains a contiguous outside edge 114. As such, small openings are not created along outside edge 114, thereby reducing or eliminating mold flash.

In operation, mold assembly 20 in accordance with the present invention is used for forming data storage replica disks which are formatted on both sides, as part of a disk replication process. The replica disks are capable of containing a high density of information, may be molded at very small track pitches, and have reduced or eliminated surface relief imperfections or protrusions, such as mold flash.

Referring to FIG. 2, first stamper 40 is secured against the first mirror block 26 first major surface 30 using first outer holder 62. Similarly, second stamper 42 is secured against the second mirror block 28 second major surface 32 using second outer holder 64. Inner holder 46 may retain second stamper 42 at an inside edge. Moving side 24 is moved towards fixed side 22, moving mold assembly 20 from an open position to a closed position. In the closed position, mold assembly 20 is ready to receive disk molding material for molding a desired replica disk. Once in a closed position, a disk molding material (e.g., a polycarbonate resin), is injected under pressure through sprue channel 36, indicated by arrows 37A, 37B, 37C and 37 D, until disk substrate cavity 34 is filled.

Referring to FIGS. 4 and 5, as disk substrate cavity 34 is filled, outward pressure is created from the disk substrate cavity 34 on the mold assembly 20 (indicated by directional arrows 74, 76), major surface 82, stripper first surface 88, and second outer holder first surface 90, overcoming mold press clamp force 72. First outer holder 62 is moveable relative to stripper mechanism 66 at first running surface 92 and second running surface 96. Stripper mechanism 66 maintains contact with second outer holder 64 at second running surface 94. First running surface 92, second running surface 94, and third running surface 96 allow the mold assembly to "breathe" during the filling or injection of disk material into the disk substrate cavity 34 by maintaining a contiguous surface 60.

In order to maintain a contiguous outside edge 60 for reduction or elimination of mold flash, first mechanism 68 applies a counter force to stripper mechanism 66. As such, movement is accomplished at the running surfaces 92, 96, while pressure and contact is also maintained at these running surfaces, including surface 94. During the entire disk molding operation, continuous contact is maintained along the running surfaces 92, 94, 96, and in particular, along second running surface 94 between the stripper mechanism 66 and the second outer holder 64.

After disk substrate material is injected into the disk substrate cavity 34 (and the desired surface relief pattern or formatted surface is replicated into the replica disk substrate by first stamper 40 and second stamper 42), a gate cut 44 is brought forward to cut a center hole in the replica disk substrate. After the replica disk has sufficiently cooled, the mold assembly 20 is opened and the gate cut 44 and product eject 48 are brought forward for ejecting the formatted replica disk substrate off the second stamper 42 and mold assembly 20. Due to the unique mold assembly in accordance with the present invention, a disk substrate may be molded in a single step, having a formatted surface on both sides while eliminating surface protrusions or defects such as mold flash inherent in conventional molding processes.

In reference to FIGS. 6–8, the unique disk molding process in accordance with the present invention may also be applied to molding disk substrates formatted on a single side. As such, the use of a second outer holder is no longer necessary.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed:

1. A mold assembly for forming an optical data storage disk in a disk molding process, the optical data storage disk having a formatted surface on both sides, the mold assembly comprising:

a disk substrate cavity defined by a first block having a first major surface, a second block having a second major surface, and an outside edge;

a first stamper having an outside edge;

a first outer holder including a first holder edge which extends over the outside, edge of the first stamper, coupling the first stamper to the first major surface;

a second stamper having an outside edge;

a channel in fluid communication with the disk substrate cavity for allowing disk molding material to entry the disk substrate cavity;

a second outer holder including a second outer holder edge which extends over the outside edge of the second stamper for coupling the second stamper to the second major surface; and a stripper mechanism located at the outside edge positioned between the first outer holder and the second outer holder, wherein the stripper mechanism is moveable relative to the first outer holder and the second outer holder.

2. The assembly of claim 1, further comprising:

means for moving the stripper mechanism relative to the first outer holder.

3. The assembly of claim 2, wherein the means for moving the stripper mechanism relative to the first outer holder moves the stripper mechanism in a direction generally perpendicular to the first major surface.

4. The assembly of claim 1, wherein the first block is movable relative to the second block.

5. A mold assembly for forming an optical data storage disk in a disk molding process, the optical data storage disk having a formatted surface on both sides, the mold assembly being moveable between a mold open position and a mold close position, the mold assembly comprising:

a first mirror block having a first major surface;

a second mirror block having a second major surface, wherein when the mold assembly is in the mold close position the first major surface and the second major surface define a disk substrate cavity, the disk substrate cavity having an outside edge;

a channel in fluid communication with the disk substrate cavity for allowing disk molding material to enter the disk substrate cavity to form the optical data storage disk;

a first stamper located on one side of the disk substrate cavity for forming a formatted pattern into the optical data storage disk;

means located at the outside edge for removably coupling the first stamper to the first major surface;

a second stamper located on a side of the disk substrate cavity opposite the first stamper, for forming a formatted pattern in the optical data storage disk;

means located at the outside edge for removably coupling the second stamper to the second major surface; and stripper mechanism located at the outside edge positioned between the means for removably coupling the first stamper and the means for removably coupling the second stamper, wherein the stripper mechanism is moveable relative to the means for removably coupling the first stamper and means for removably coupling the second stamper.

6. The assembly of claim 5, wherein the stripper mechanism is moveable in a direction generally perpendicular to the first major surface and the second major surface.

7. The assembly of claim 5, wherein the means for removably coupling the first stamper to the first major surface is a first outer holder, the first outer holder including a first holder edge which extends over an outside edge of the first stamper for coupling the first stamper to the first major surface.

8. The assembly of claim 7, wherein the first outer holder is located between the stripper mechanism and the first mirror block.

9. The assembly of claim 7, wherein the stripper mechanism includes a stripper mechanism first running surface, and the first outer holder includes a first outer holder running surface, wherein the stripper mechanism first running surface and the first outer holder running surface are operably arranged such that the stripper mechanism first running surface continuously contacts the first outer holder running surface when the mold assembly is in a closed position and when disk molding material is injected into the disk substrate cavity.

10. The assembly of claim 9, further wherein the stripper mechanism includes a stripper mechanism second running surface and the means for removably coupling the second stamper to the second major surface includes coupling means running surface, wherein the stripper mechanism second running surface and the coupling means running surface are operably arranged such that the stripper mechanism second running surface continuously contacts the coupling means running surface when the mold assembly is in a closed position and disk material is injected into the disk substrate cavity.

11. The assembly of claim 5, further comprising:

means coupled to the stripper mechanism for moving the stripper mechanism relative to the means for removably coupling the first stamper to the first major surface.

12. The assembly of claim 5, wherein when mold material is injected into the disk substrate cavity an outward force is applied to the mold assembly by the injected mold material, and wherein the assembly further comprises means for applying a force to the stripper mechanism in a direction opposite the outward force, and in a magnitude equal or greater than the outward force.

13. A mold assembly for forming an optical data storage disk in a disk molding process, the optical data storage disk having a formatted surface on both sides, the mold assembly being movable between a mold open position and a mold close position, the mold assembly comprising:

a first mirror block having a first major surface;

a second mirror block having a second major surface, wherein the first major surface and the second major surface define a disk substrate cavity having an outside edge, when the mold assembly is in the mold close position;

a channel in fluid communication with the disk substrate cavity for allowing the disk molding material to enter the disk substrate cavity to form the optical data storage disk;

a first stamper located on one side of the disk substrate cavity for forming a formatted pattern into the optical data storage disk;

a first outer holder having an edge extending over an outer edge of the first stamper, coupling the first stamper to the first major surface;

a second stamper located on a side of the disk substrate cavity opposite the first stamper for forming a formatted pattern into the optical data storage disk;

a second outer holder having an edge extending over an edge of the second stamper, coupling the second stamper to the second major surface; and a stripper mechanism located at the outside edge positioned between the first outer holder and the second outer holder, wherein the stripper mechanism is movable relative to the first outer holder and the second outer holder.

14. The assembly of claim 13, wherein the stripper mechanism includes a stripper mechanism first running surface, and the first outer holder includes a first outer holder running surface, wherein the stripper mechanism first running surface and the first outer holder running surface are operably arranged such that the stripper mechanism first running surface continuously contacts the first outer holder running surface when the mold assembly is in a closed position and when disk molding material is injected into the disk substrate cavity.

15. The assembly of claim 13, wherein when mold material is injected into the disk substrate cavity an outward force is applied to the mold assembly by the injected mold material, and wherein the assembly further comprises means for applying a force to the stripper mechanism in a direction opposite the outward force, and in a magnitude equal or greater than the outward force.

* * * * *